United States Patent [15] 3,699,551
Fischer [45] Oct. 17, 1972

[54] DOMAIN PROPAGATION ARRANGEMENT

[72] Inventor: Robert Frederick Fischer, Livingston, N.J.
[73] Assignee: Bell Telephone Laboratories, Incorporated, Murray Hill, N.J.

[22] Filed: Oct. 20, 1970
[21] Appl. No.: 82,426

[52] U.S. Cl. ........................340/174 TF, 340/174 SR
[51] Int. Cl. ........................G11c 19/00, G11c 11/14
[58] Field of Search ................................340/174 TF

[56] References Cited

UNITED STATES PATENTS 3,543,252 11/1970 Perneski ..............340/174 TF
3,597,748 8/1971 Bonyhard.............340/174 TF Primary Examiner—James W. Moffitt
Attorney—R. J. Guenther and Kenneth B. Hamlin

[57] ABSTRACT

Single wall domains are moved generally in a slice of magnetic material by a magnetically soft T and bar-shaped overlay pattern on a single surface of the slice in response to a magnetic field rotating in the plane of the slice. The overlay pattern includes consecutive elements alternatively parallel to first then second orthogonal axes. Operational and manufacturing advantages are realized if overlay elements aligned with one axis are on one surface of the slice and the overlay elements aligned with the orthogonal axis are on the other, the relative positions of all elements with respect to one another in the plane of the slice being preserved otherwise.

7 Claims, 4 Drawing Figures

INVENTOR
R. F. FISCHER
BY Herbert M. Shapiro
ATTORNEY

DOMAIN PROPAGATION ARRANGEMENT

FIELD OF THE INVENTION

This invention relates to data processing arrangements and, more particularly, to such arrangements comprising domain propagation devices.

BACKGROUND OF THE INVENTION

Domain propagation devices are well known in the art. In most such devices, a reverse-magnetized domain, having spaced apart leading and trailing domain walls, is moved controllably in a channel structured to prevent lateral motion of the domain. The Bell System Technical Journal (BSTJ), Volume XLVI, No. 8, Oct. 1967, at page 1901 et seq., on the other hand, describes a domain which is (self) bounded, in the plane of a sheet of suitable magnetic material, by a single domain wall and is free to move in that plane. Movement of a domain in the latter case is in response to an offset structured magnetic field (gradient) which displaces the domain.

A typical magnetic sheet in which single wall domains are moved comprises, for example, a rare earth orthoferrite, a strontium or barium ferrite, or a garnet. The domains assume the shape of right circular cylinders, the axes of which are normal to the plane of a sheet of these materials. A suitable sheet is characterized by a preferred direction of magnetization normal to the sheet, magnetization in a first direction along that normal being considered negative (−) and magnetization in a second direction being considered positive (+). A convenient convention is to represent a single wall domain in such a sheet as an encircled plus sign where the circle in the plane of the sheet represents the encompassing single wall of the domain. In connection with the ensuing discussion, the plus sign is omitted and the domain represented solely as a circle, it being implicitly understood that the magnetization elsewhere in the sheet other than within circles is negative.

There are a variety of techniques for moving single wall domains. One comprises offset conductor loops pulsed in sequence to displace domains to next consecutive positions. The displacement is effected by the magnetic field gradient temporarily induced by the current pulse in the conductors. This technique permits highly flexible control over individual domains since a large number of permutations of current polarities in a network of individual conductors are possible. But the technological difficulties of manufacturing a continuous network of fine conductors make it difficult to realize the minute dimensions required to manipulate very small domains, for example, domains of the order of microns in diameter.

Another technique for moving single wall domains employs a magnetically soft structured overlay pattern on the sheet in which single wall domains are moved. Such an arrangement is disclosed in copending application Ser. No. 732,705, filed May 28, 1968 for A. H. Bobeck now U.S. Pat. No. 3,534,347. The overlay generates a pattern of magnetic poles which move in the overlay in response to controlled changes in direction of an externally produced magnetic field applied parallel to (viz., in) the plane of the sheet. The poles attract or repel domains along a predictable path determined by the particular overlay pattern and the consecutive orientations of the externally applied magnetic field.

The latter technique has the virtue that the structured overlay that physically establishes the position and the motion of the domains is not required to carry currents and so can be substantially thinner than current-carrying conductors. The fine line overlay patterns consequently, offer fewer technological difficulties when manufactured in the dimensions required to manipulate domains of minute size. The technique also permits the movement of all domains in a sheet without discrete wiring connections. common write-read A propagation technique employing such an overlay is clearly attractive for recirculating type memories, such as disc files, where information is moved synchronously and the read and write operations are carried out at a common location. This type of organization is presently realized in accordance with prior art electromechanical techniques which provide economy and reliability by reducing the number of detection and input circuits. No external connections are required except at the common write-read location.

An object of this invention is to provide a domain propagation arrangement including a magnetically soft overlay geometry which offers improved operating margins while relieving photolithographic resolution requirements for realizing that geometry.

BRIEF DESCRIPTION OF THE INVENTION

Single wall domain propagation techniques employing overlays and responsive to reorienting in-plane fields are improved in accordance with this invention by including two complementary overlay patterns on opposite surfaces of the material in which single wall domains are moved. The two overlays are configured illustratively of like elements but are aligned along orthogonal axes. Moreover, all the elements if positioned on a single surface could produce domain movement in a well understood manner in response to a reorienting in-plane field. Yet the elements of one surface are spaced too far apart to effect such movement alone.

DETAILED DESCRIPTION

Figure 1:
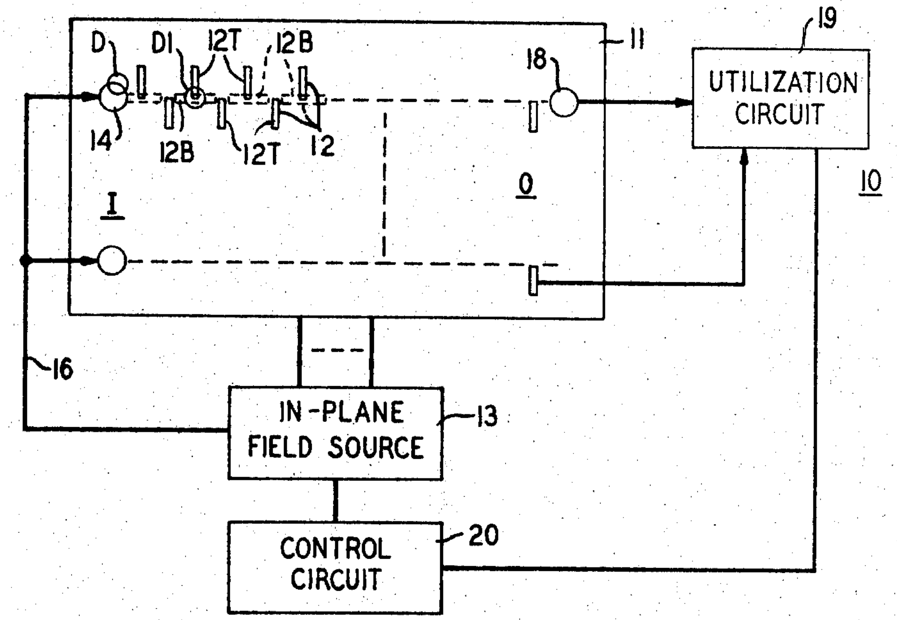
FIG. 1 is a schematic illustration of a domain propagation arrangement in accordance with this invention.

FIG. 1 shows an arrangement 10 including a sheet or slice 11 of material in which single wall domains can be moved. An overlay pattern 12 of magnetically soft material defines a number of propagation channels in slice 11. A representative channel is shown along an axis between input and output positions I and O respectively in FIG. 1.

Typically, an overlay is deposited on glass via photolithographic techniques and juxtaposed with a single surface of slice 11. The elements of the overlay appear to form a familiar T and bar-shaped geometry. With such an arrangement on a single surface of sheet 11, domains are moved from left to right as viewed, in response to a counterclockwise rotating in-plane field. It will become clear, however, that alternative elements of The overlay in accordance with this invention are disposed on opposite surfaces of sheet 11 and are designated 12T or 12B to indicate the top or bottom surface with which they are associated respectively. In such a two-sided arrangement, domains are moved from left to right by a clockwise rotating field.

An in-plane field source for effecting domain movement in such a channel is represented in FIG. 1 by a block 13.

An illustrative input position of the arrangement of FIG. 1 comprises a magnetically soft disc 14 to the periphery of which a domain D is coupled. As the in-plane field reorients, domain D moves about 14 as a source domain giving rise to a domain for propagation when the magnitude of the in-plane field is augmented appropriately. Such an input arrangement is disclosed in copending application Ser. No. 756,210, filed Aug. 29, 1968 for A. J. Perneski, now U.S. Pat. No. 3,555,527. The means for providing the augmented in-plane fields is represented generally by line 16 in FIG. 1.

When a domain, so generated, reaches the output position, its flux is detected by a conductor loop, indicated at 18 in FIG. 1, for generating a signal to be applied to a utilization circuit 19 to which it is connected as shown in FIG. 1. In practice, an additional conductor loop (not shown) may be present to collapse any domain at the position coupled by loop 18 when pulsed. In an alternative detection arrangement, a Hall type detector disclosed in copending application Ser. No. 882,900, filed Dec. 8, 1969 for W. Strauss, now U.S. Pat. No. 3,609,720 may be employed.

Source 13 and circuit 19 are connected to a control circuit 20 for synchronization and activation. Such circuits and sources may be any such elements capable of operating in accordance with this invention.

It is helpful to understand the present invention in the context of a familiar T and bar-shaped overlay which comprises elements aligned along imaginary X and Y axes not shown on a single surface of a sheet of magnetic material in which single wall domains can be moved. The operation of such a single overlay to move domains as required is fully disclosed in the above-mentioned application of Bobeck and is not described in detail herein.

In accordance with this invention, all the elements of such an overlay aligned with an X axis are on the top on a single side of the slice alone, illustratively because of the wide spacing therebetween, are not capable of producing domain movement in the presence of that same rotating broken is now 1 on a single side of the slice alone, illustratively because of the wide spacing therebetween, are not capable of producing domain movement in the presence of that same rotating field.

Figure 2:
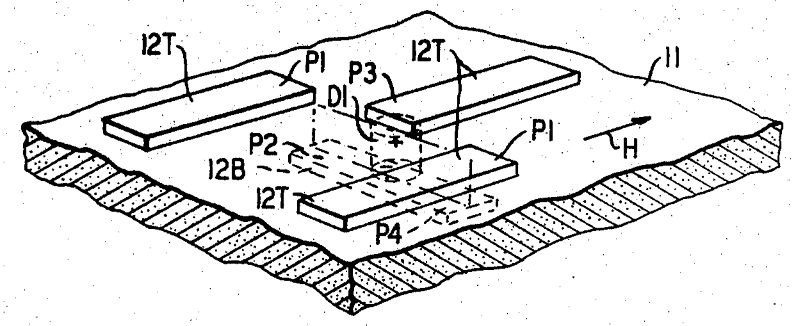
FIGS. 2, 3, and 4 are schematic illustrations of portions of the configuration of FIG. 1.

Consider the condition where orthogonal overlay patterns in accordance with this invention are disposed on opposite sides of slice 11 between the input and output positions of FIG. 1. For example, FIG. 2 shows a domain D1 of FIG. 1 in a portion of slice 11. The domain is assumed to be magnetically positive at the top surface of slice 11 as viewed and negative at the bottom surface. This condition is represented by the plus and minus signs in the representation of domain D1 in FIG. 2. When the in-plane field is in an orientation as represented by arrow H, poles form at the ends of overlay elements aligned with the field, plus poles at the ends associated with the top of arrow H, minus poles at the other end. For the geometry shown, the poles so generated on the pertinent portions of the overlays on only one surface of slice 11 are oriented to produce poles to attract the domain for each field orientation. In the absence of the overlays of one surface, the poles so generated are inoperative to move domains along a channel as the in-plane field reorients.

Figure 3:
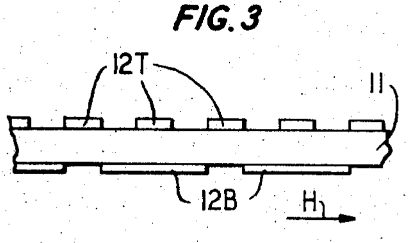

It is clear from FIG. 3 that domain D1 is in continuous contact with elements on either the top or bottom surface of slice 11. This is always the case for a domain moved in accordance with the illustrative embodiment of this invention regardless of the position of the domain. Consecutive positions P1, P2, P3, and P4 in FIG. 2 represent the positions of a domain as the in-plane field H rotates clockwise from the initial orientation shown in the figure confirming the constant contact of a domain with overlay elements. Because of this constant contact, overlays in accordance with this invention on opposite surfaces impose a relatively confining structure for domains thus reducing any tendency of those domains to be distorted because of crystal imperfections in sheet 11. The chance of crystal imperfections deflecting domains from their channels is thus significantly reduced.

There are a number of other advantages which attend the use of an overlay in accordance with this invention. First, since only alternate elements of a complete T and bar-shaped overlay pattern are present on a single surface in accordance with this invention, those elements can be of simple geometry (viz., no T-shaped elements) and spaced apart from one another farther than would be the case if they were all on a single surface. Consequently, the requirements on the photolithographic technology are reduced and overlay patterns with relatively small periods can be realized. Moreover, each element may be larger than its counterpart in, for example, the T and bar-shaped overlay on a single surface, without resulting in a closing of the gap between elements. In fact, relatively large elements in accordance with this invention merely provide a desirable overlap between the elements of the two surfaces when viewed as in FIG. 1. Of course, in embodiments wherein such overlap occurs, the elements would not necessarily constitute an operative arrangement if disposed on a single surface.

The reduced requirements on photolithographic technology may be illustrated by an example. A T and bar-shaped overlay with a 0.4 mil period is achievable with presently available photoresist techniques. If the overlay is deposited on a single surface of a domain material, each element is about 0.05 × 0.25 mils spaced apart 0.05 mil. If the elements are deposited on two surfaces, on the other hand, each element is 0.1 × 0.3 mils spaced apart 0.1 mil. Note that the same period is realized yet the elements are larger and spaced farther apart. Of course, any alignment problem which might arise in positioning elements on two surfaces is reduced because of the relatively large permissible size of the elements.

Figure 4:
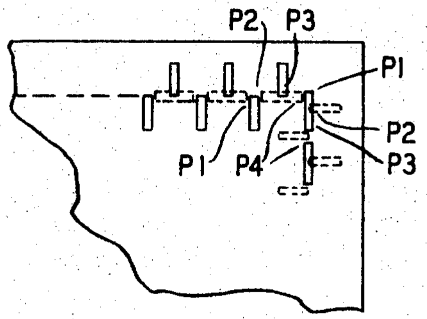

Another advantage stems from the fact that the geometry of a one-sided overlay often varies at corners which appear in propagation channels particularly where a closed loop geometry is required for recirculating information. This variation is attended usually by a reduction in operating margins and failures first occur at such corners when operating parameters are varied under test conditions. In accordance with this invention, on the other hand, only negligible geometry change occurs at corners. This is clear from an examination of FIG. 4 where consecutive positions for a domain are designated P1, P2, P3, and P4, as above, a domain moving from left to right and then downward, as viewed, in response to an in-plane field rotating clockwise. The only change is due to the fact that elements which intersect a propagation path are slightly longer than those aligned with the path as is the case with the familiar T-bar. This relationship is reversed at corners. Experience has indicated that circuits with two-sided overlays in accordance with this invention exhibit margins which are no less at the corners than along straightline portions of the propagation channel itself.

The advantages of complementary overlays on two surfaces of a domain material in accordance with this invention may be appreciated more fully from a comparison of operating parameters of a single overlay arrangement and a complementing overlay arrangement of corresponding geometry. For a slice of $SmTbFeO_3$ having a thickness of about 2 mils and domains having 2 mil diameters, a rotating in-plane field of over 35 oersteds moves a domain pattern at a data rate of about 400 kilobits per second. In this instance, the overlay is permalloy having a coercive force of about one oersted. The overlay is ≈4,000 A thick and has a period of 8 mils. If a two-sided overlay pattern is used in accordance with this invention, the same data rate is achieved with an in-plane field of less than 15 oersteds. Alternatively, a data rate of over 900 kilobits per second is achieved with an in-plane field of 35 oersteds. A bias field normal to the plane of slice 11 is usually provided during operation, typically 45 oersteds.

In practice, two-sided overlays in accordance with this invention have exhibited the highest data rate for overlay circuits — on the order of megahertz — approaching data rates achieved with conductor circuits. In one instance, a crystal of europium-erbium garnet 0.5 mil thick was employed. Domains having diameters of about 0.3 mil were moved along an overlay having a period of 1.2 mils with an in-plane field of about 35 oersteds. Megahertz data rates were achieved.

What has been described is considered only illustrative of the principles of this invention. Therefore, various modifications can be devised by those skilled in the art in accordance with those principles within the spirit and scope of this invention. For example, a two-sided overlay in accordance with this invention may occupy only a small area of the overlay pattern where the remainder may be formed on a single side. Also, other than T and bar-shaped geometries exhibit improved performance when disposed in a two-sided arrangement as, for example, the now familiar Y-bar geometry.

What is claimed is:

1. An arrangement comprising a layer of material in which single wall domains can be moved and having first and second surfaces, first and second overlay patterns on said first and second surfaces respectively, each of said patterns including a plurality of magnetically soft elements each being elongated and disposed with respect to one another along an axis between input and output positions such that a domain does not move from one of said elements to the next in response to a reorienting in-plane field generating attracting poles in moving patterns therein, said first and second patterns being disposed with respect to one another such that elements at only alternative ones of said first and second surfaces attract domains to consecutive positions in response to said in-plane field wherein said elements on said first surface have dimensions along said axis to overlap the next adjacent operative elements on said second surface along said axis.

2. An arrangement in accordance with claim 1 wherein the elements on said first and second surfaces are elongated along first and second orthogonal axes respectively.

3. An arrangement in accordance with claim 1 wherein alternative elements on said first surface are offset laterally with respect to said axis.

4. An arrangement in accordance with claim 3 including means for providing a rotating in-plane field.

5. An arrangement in accordance with claim 4 including means for providing domains at said input position and means for detecting domains at said output position.

6. An arrangement in accordance with claim 1 wherein said elements on each one of said first and second surfaces are spaced apart such that poles generated consecutively in next adjacent ones of said elements by said reorienting field are insufficient to move domains therealong.

7. An arrangement in accordance with claim 1 wherein said elements are bar-shaped, those of said elements on said first surface being aligned along a first axis and those on said second surface being aligned along a second axis orthogonal thereto.

* * * * *